Aug. 25, 1953 A. S. GRIFFITH, JR 2,649,714
LIQUID LEVEL GAUGE
Filed Dec. 20, 1951 2 Sheets-Sheet 2

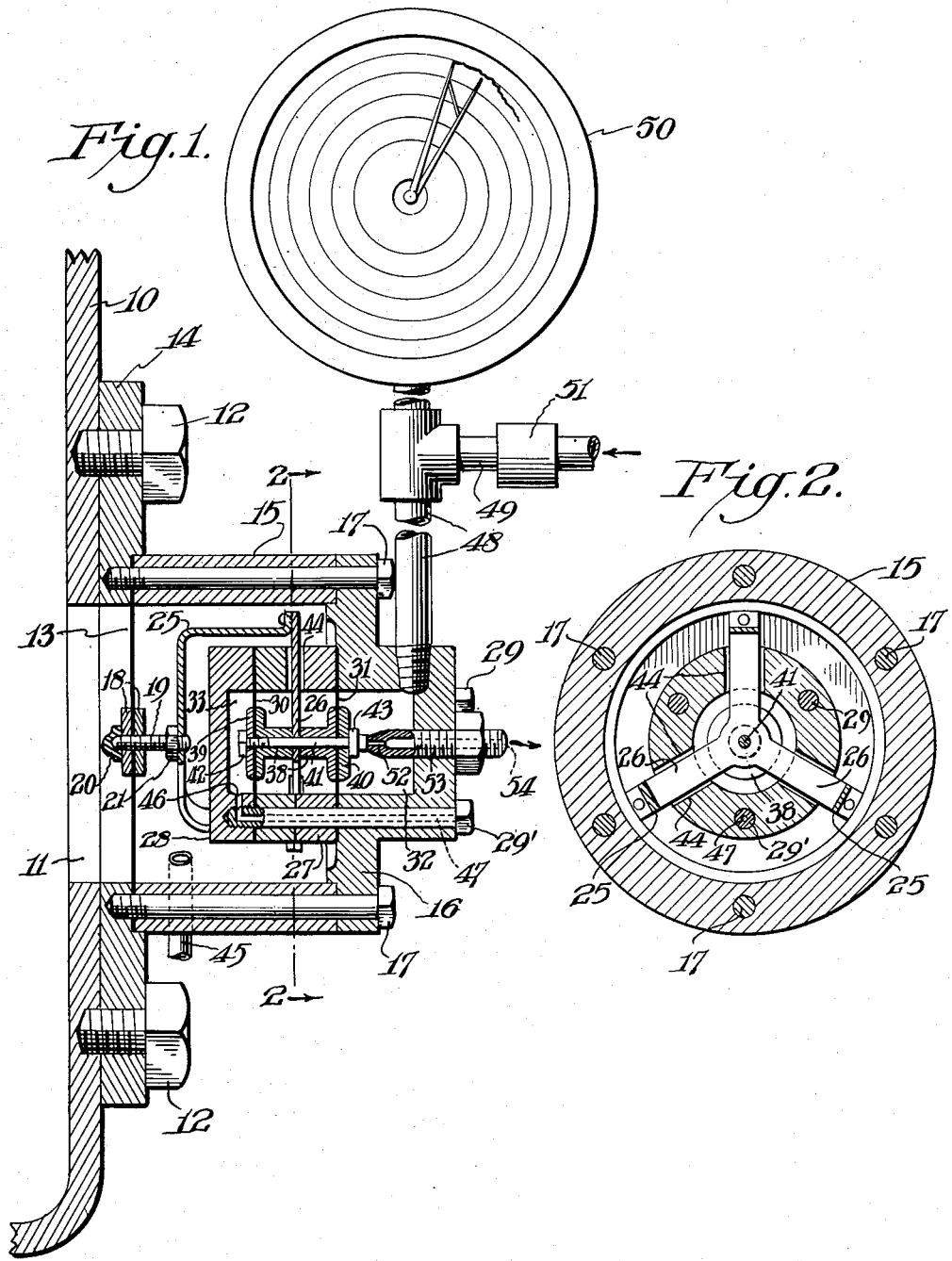

INVENTOR:
Andrew S. Griffith, Jr.,
BY Harry J. McCauley
ATTORNEY.

Patented Aug. 25, 1953

2,649,714

UNITED STATES PATENT OFFICE 2,649,714

LIQUID LEVEL GAUGE

Andrew S. Griffith, Jr., Waynesboro, Va., assignor to E. I. du Pont de Nemours & Company, Wilmington, Del., a corporation of Delaware Application December 20, 1951, Serial No. 262,550

3 Claims. (Cl. 73—299)

This invention relates to improvements in liquid level gages and particularly to liquid level gages of the force-balanced diaphragm type, such as those used for the measurement of the levels of liquids stored at subatmospheric pressures, or under pressures which may vary over a relatively wide range from subatmospheric to considerably above atmospheric pressure.

Force-balanced, diaphragm type liquid level gages have hitherto been employed for the sensing of differential pressures wherein the lower limit of the range is below the atmospheric pressure level, however, measurement has been effected at the same relatively low absolute pressures. This has been disadvantageous, because of the small flows of air required for counterbalancing and the criticality of the sizes of the orifices which must necessarily be employed, both from the standpoint of fabrication and adjustability. This disadvantage becomes progressively more serious as the absolute ambient pressure of the system to be evaluated decreases until, in situations corresponding to that in which it is desired to measure levels of below about 40 in. of water under absolute pressures of 10–20 mm. Hg by pressure differential, conventional gages become entirely unreliable.

It is a primary object of this invention to provide a force-balanced, diaphragm type liquid level gage wherein measurement can be accomplished at superatmospheric pressure.

It is another object of this invention to provide a force-balanced, diaphragm type liquid level gage having few parts, and which is economical in first cost and maintenance.

Another object of this invention is to provide a force-balanced, diaphragm type liquid level gage having low inertia characteristics and therefore a high sensitivity of response.

Another object of this invention is to provide a force-balanced, diaphragm type liquid level gage adapted to use with viscous or polymerizable liquids which has little dead space wherein the liquids can collect and thereby interfere with operation.

Figure 3:
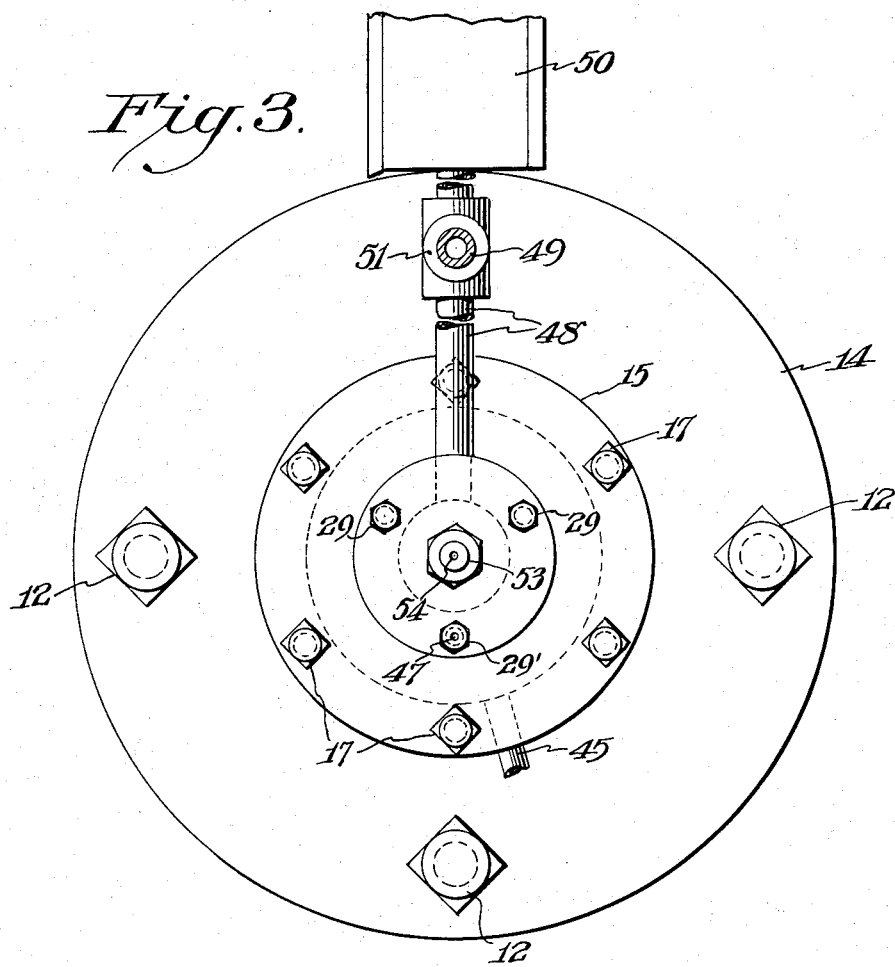
Figure 4:
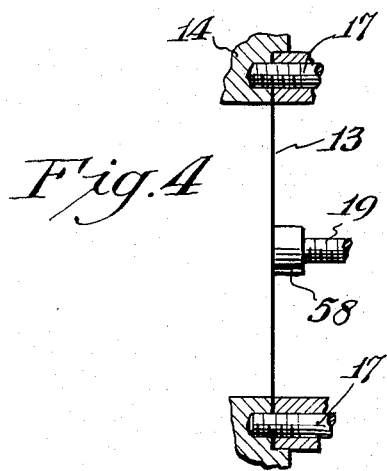

The manner in which these and other objects are attained will become apparent from the following detailed description and the accompanying drawings, in which:

Fig. 1 is a sectional side elevational view of one embodiment of this invention utilized for the measurement of the level of a liquid within a tank, the interior of which is maintained at an absolute pressure of the order of 20 mm. Hg or lower, or wherein the ambient pressure is variable between this and higher levels, Fig. 2 is a full sectional view of the apparatus taken along line 2—2 of Fig. 1, Fig. 3 is an end elevational view of the apparatus looking in the direction of the liquid storage tank to which it is attached, Fig. 4 is a detail view of a preferred embodiment of sensing diaphragm having an abutting connection with the transmitter mechanism.

Generally, the objects of this invention are accomplished by providing a sensing diaphragm in direct contact with the liquid measured against which the pressure of the liquid is applied and communicating this pressure to a multiple diaphragm transmitter, which compensates for the lowest pressure of the system and is at the same time opposed by the balancing pressure of an indicating system operating above atmospheric level.

Referring to Fig. 1, the gage assembly is attached to the tank wall 10 in fluid-tight relationship by bolts 12 engaging with blind tapped holes in the tank wall. When the gage is mounted on the side wall it is preferred to locate it as close to the bottom of the tank as practicable, so that the sensing diaphragm 13 will be below the level of the liquid for all depths which it is desired to measure. Mounting on the side of the tank has the advantage that the gage is usually more accessible than if it is mounted on the bottom, however, there is no reason why it cannot be mounted in the latter position if this is desired. When the gage is mounted on the bottom of a tank it will be understood that the weight of the elements supported by the diaphragms will introduce a zero shift into the readings which must be compensated for by adjustment of the zero point of the indicating instrument, or in other similar ways known to the art and therefore not further described herein.

The tank is provided with a circular port 11 of the same size as the central opening of base ring 14, thus exposing diaphragm 13 to direct contact with the liquid contents of the tank. It is desirable to locate diaphragm 13 as close to prolongation with the inside tank wall as possible, particularly when viscous or polymerizable liquids are involved, to minimize the collection of material within port 11 which might otherwise cause spurious indications. This consideration usually favors side mounting of the gage, as opposed to bottom mounting, because the interior side walls of a tank can generally be cleaned more readily than the bottom and, also, settling results in the deposition of solids on the bottom surfaces between successive cleanings.

As best seen in Fig. 1, the gage housing comprises externally recessed base ring 14, cylindrical side wall 15 and cap 16, these elements being secured together as a unit by bolts 17 which engage with blind tapped holes in ring 14. The outer periphery of diaphragm 13 is provided with holes mating with bolts 17, to permit insertion of the bolts therethrough, and the diaphragm is thus retained in a vertical plane by compression between ring 14 and side wall 15.

The central portion of diaphragm 13 is strengthened by washers 18 and is drilled to receive machine screw 19, which is firmly secured to the diaphragm by nut 20. The opposite end of screw 19 is attached to spider 25 by passage through a hole in the central portion of the spider and retention by locknut 21. Spider 25 may conveniently be of unitary construction, with three equidistantly arranged arms flanged at the ends for screw attachment with the three similarly disposed arms of yoke 26, shown in plan in Fig. 2.

A preferred construction for transmitting deflection of diaphragm 13 to spider 25 obviating positive connection therebetween is shown in Fig. 4. In this arrangement the pressure of the liquid applied to diaphragm 13 causes the diaphragm to abut against a knob 58, which is preferably fabricated from a substance light in weight, such as a polymeric material, fixedly secured to the end of screw 19. Elimination of a positive connection between diaphragm 13 and screw 19 in this manner has the advantages that assembly of the apparatus is simplified and there is less possibility of liquid leakage from the tank into the gage housing, due to the fact that the central area of 13 is not perforated.

A two-part sub-housing comprising a cylindrical side wall element 27 and an interior closure cap 28, both secured to cap 16 by bolts 29, supports the two diaphragms 30 and 31 in a vertical plane parallel to diaphragm 13. In this connection, diaphragm 31 is provided with peripherally disposed holes mating with bolts 29 and is compressed in air-tight relationship between base cap 16 and side wall 27 so that it forms, with cap 16, a chamber 32. Diaphragm 30 is in all respects identical to 31, except that it is compressed between side wall 27 and cap 28, thus defining chamber 33.

Diaphragms 30 and 31 are rigidly connected to each other and to the hub of yoke 26 by half-spool separators 38, disposed on adjacent sides of the diaphragms, and gaskets 39 and 40 on the other sides thereof, gasket 40 being provided with an integral threaded stem 41 passing through central apertures in each of the recited elements in turn and carrying securing nut 42 at its remote end. A closure disc 43, adapted to throttle the flow of air through orifice 52 of bleed nozzle 53, is secured to the right-hand side of gasket 40.

As is apparent from Fig. 1, sub-housing sidewall 27 is provided with slots 44 of sufficient width to permit free horizontal movement of yoke 26 in response to movements of diaphragm 13, to which 26 is attached by spider 25. At the same time slots 44 establish open communication between the interior of the central chamber of the sub-housing and the interior of the gage housing, thus insuring maintenance of the same pressure in both enclosures at all times. This pressure is made equal to the absolute pressure maintained over the liquid stored in the tank by connecting the interior of the gage housing to a point in the tank above the maximum liquid filling level through line 45.

Chamber 33, of which diaphragm 30 constitutes one wall is vented to the atmosphere, which may be conveniently accomplished by providing a passage 46 in communication with a through-going drilled passage 47 extending the full length of bolt 29', or by other suitable means. Chamber 32, through which the balancing pressure is applied, is supplied with air at superatmospheric pressure by line 48 which is connected with line 49. The supply of air is at a constant flow rate, which is maintained by a constant differential flow controller 51, such as the Model 63BU design marketed by the Moore Products Co. and shown in its Bulletin 601. The air supplied to controller 51 is derived from a conventional constant pressure source, not shown, which is preselected to maintain a pressure level several pounds higher than the maximum liquid head pressure which the gage is intended to measure. A standard indicating-recording instrument 50, which may be calibrated to read directly in terms of liquid level, is also connected in line 48. Air discharging from chamber 32 as a result of the throttling action of disc 43 on orifice 52 passes into the atmosphere through the exterior opening 54 of bleed nozzle 53.

In operation, air is supplied to chamber 32 from line 49 and its associated flow controller 51 at a predetermined flow rate which develops a pressure in chamber 32 sufficient to overcome the maximum head of liquid which is to be stored in the tank. One commonly used design of indicator-recorder 50 has an operating pressure range of 3 to 18 lbs./sq. in., therefore, a maximum pressure just below 18 lbs. gage may be adopted as the upper datum level. By proportioning the areas of diaphragms 30 and 31 in the proper ratio to the area of diaphragm 13, it will be understood that a relatively wide range of liquid levels may be measured by the device of this invention while still using a 3–18 lb. range indicator-recorder.

The head of liquid confined in the tank exerts a pressure on diaphragm 13 which is proportional to the height existing above the diaphragm. Where the gage is mounted on the tank side wall, as hereinabove described, it is preferred to limit measurements by indicator-recorder 50 to the determination of liquid levels above port 11, so that the ambient pressure in chamber 32 is always appreciably above atmospheric. Such a practice also eliminates any error which might result from only partial submersion of diaphragm 13. Where the gage is used in this manner, indicator-recorder 50 can either be calibrated to include the head below the upper edge of 11 as an invariable factor, or the zero point of the scale of 50 may be taken as located here and the residual material in the tank ignored for purposes of gaging, whichever is desired.

Analysis of the forces acting on the several diaphragms of differential gages constructed according to this invention shows that the net effective force transmitted to the left side of diaphragm 31 is equal to that of the head of liquid confined in the storage tank solely. This condition is brought about by the pressure compensation effected by diaphragm 30 (Fig. 1), the right side of which is under the same pressure as that existing above the liquid by open connection with the top of the tank through line 45. To permit indication at superatmospheric pressures, it is necessary to add a rightward-acting increment of force equal to the prevailing atmospheric pressure, and this is accomplished by exposing the left side of diaphragm 30 to the atmosphere through drilled passage 47 of bolt 29'. The net effective pressure applied to diaphragm 30 is added to that derived from the combined spider-yoke mechanical connection with diaphragm 13 and is transmitted directly to the left side of diaphragm 31 through the spool-gasket connection hereinbefore described. This pressure urges closure disc 43 against orifice 52 of bleed nozzle 53 in opposition to the pressure of the balancing air supplied to the right side of diaphragm 31 through line 48. The net pressure transmitted to the left side of 31 is always less than the balancing pressure exerted against the right side, therefore, more or less air is permitted to escape to the atmosphere through bleed nozzle 53 and the ambient pressure in chamber 32, measured by indicator-recorder 50, is a function of the liquid head pressure of the contents of the storage tank.

It will be understood that, while liquid level gages constructed according to this invention have particular utility in the measurement of levels of liquids which are stored under vacuum, or where the pressure over the liquids may occasionally fall from atmospheric or superatmospheric to subatmospheric levels, all of the advantages are retained even where operation is entirely within the superatmospheric range. In tests it has been determined that the gage possesses a substantially linear indication at all pressure levels and has a sensitivity greater than about 0.1" of water change in liquid level within in the region just covering diaphragm 13 to 100" or more.

Many other changes and modifications within the spirit of this invention will occur to persons skilled in the art, wherefor it is desired to be limited only by the scope of the following claims.

What is claimed is:

1. A force-balanced liquid level gage comprising in combination a housing, a sensing diaphragm constituting one wall of said housing, a sub-housing disposed within said housing comprising a first chamber defined by a first diaphragm disposed parallel to said sensing diaphragm and a second chamber defined by a second diaphragm disposed parallel to said sensing diaphragm, the outside walls of said first and second diaphragms and the inside wall of said sensing diaphragm being subjected to the pressure existing above the liquid measure and the inside wall of said first diaphragm being subjected to atmospheric pressure, a rigid mechanical connection between said first and second diaphragms, means transmitting forces acting on the outside surface of said sensing diaphragm to said rigid mechanical connection, a bleed nozzle connecting said second chamber with the atmosphere with its inlet disposed adjacent the inside wall of said second diaphragm whereby air flow through said nozzle is throttled by inward movement of said second diaphragm, means supplying balancing air to said second chamber at a substantially constant rate of flow and a predetermined pressure slightly greater than the maximum head of the liquid level which it is desired to measure, and means for indicating the pressure existing in said second chamber as a function of the existing liquid level.

2. A force-balanced liquid level gage comprising in combination a housing, a sensing diaphragm constituting one wall of said housing, a sub-housing enclosed within said housing and co-axial therewith, two transmitter diaphragms mounted within said sub-housing in parallel relationship with said sensing diaphragm, one transmitter diaphragm defining a first chamber adjacent said sensing diaphragm with one end of said sub-housing, the other transmitter diaphragm defining a second chamber with the opposite end of said sub-housing, and the space between said transmitter diaphragms being in open communication with the interior of said housing, a rigid mechanical connection between said two transmitter diaphragms, means transmitting forces acting on said sensing diaphragm in the direction of the interior of said housing to said rigid mechanical connection between said two transmitter diaphragms, an open fluid passage in said housing communicating with the space above the liquid measured, an open fluid passage connecting said first chamber with the atmosphere, a bleed nozzle connecting said second chamber with the atmosphere, a closure disc on the chamber side of the diaphragm defining said second chamber disposed to throttle the flow of air through said bleed nozzle, means supplying balancing air at a substantially constant rate of flow and a predetermined pressure slightly greater than the maximum head of the liquid level which it is desired to measure connected to said second chamber, means for indicating the pressure existing in said second chamber as a function of liquid level, and means for mounting said gage on the enclosure containing the liquid measured with said sensing diaphragm in direct contact with the liquid at the point wherein the maximum pressure of the range examined exists.

3. A force-balanced liquid level gage according to claim 1 wherein said means transmitting forces acting on the outside surface of said sensing diaphragm to said rigid mechanical connection comprises an abutment element attached to said rigid mechanical connection and disposed closely adjacent the inside wall of said sensing diaphragm, whereby movements of said sensing diaphragm are transmitted to said abutment element.

ANDREW S. GRIFFITH, Jr.

References Cited in the file of this patent

UNITED STATES PATENTS

| Number | Name | Date |
|---|---|---|
| 2,418,614 | Annin | Apr. 8, 1947 |
| 2,467,365 | Annin | Apr. 19, 1949 |
| 2,520,547 | Hughes | Aug. 29, 1950 |
| 2,584,455 | Hughes | Feb. 5, 1952 |